June 24, 1952     J. F. HATCH ET AL     2,601,610
RADIO AERIAL INSTALLATION
Filed Feb. 3, 1949
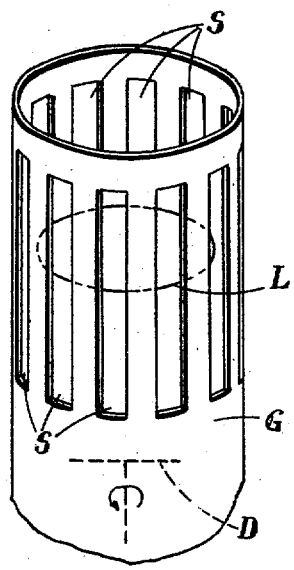
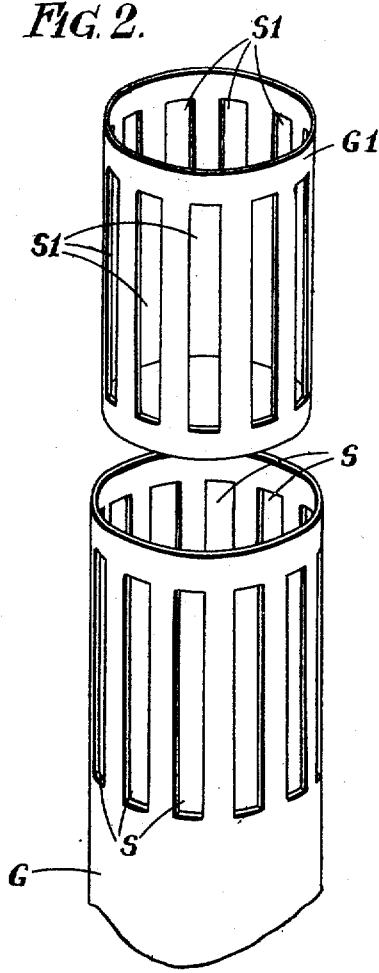
Inventors:
James Frederick Hatch and
John William Brittain;
By their attorneys,
Baldwin, Wight, & Prevost Patented June 24, 1952

2,601,610

UNITED STATES PATENT OFFICE 2,601,610

RADIO AERIAL INSTALLATION

James Frederick Hatch, Hutton, Brentwood, and John William Brittain, Great Baddow, England, assignors to Marconi's Wireless Telegraph Company Limited, London, England, a company of Great Britain Application February 3, 1949, Serial No. 74,374
In Great Britain March 18, 1948

4 Claims. (Cl. 343—106)

This invention relates to radio aerial installations and more particularly to installations of the kind in which it is required to obtain a rotary radiation diagram or a radiation diagram having a rotary component of radiation modulation.

The invention seeks to provide improved radio aerial installations of the kind referred to whereby a desired rotating radiation diagram component can be obtained without exciting a separate aerial proper and which shall be such as to enable a high rotational speed of the radio diagram to be obtained with only a slow speed of mechanical rotation.

A further object of the invention is to provide installations of the kind referred to which shall be of great mechanical simplicity offering little practical difficulty as respects mechanical rotation and which shall be such that the said mechanical rotation substantially does not affect impedance matching as respects the exciting aerial element or elements proper.

Although the invention is of wide application it is particularly well adapted to omni-directional radio beacons (O. R. B.) and will be specifically described later herein as applied to such beacons.

According to this invention a radio aerial installation includes a plurality of apertured masks each having a series of apertures through which radiation occurs and which are spaced in accordance with a predetermined pattern and means for producing relative rotation between said masks, the relative rotational speed or speeds and the number and spacing of the apertures in the individual masks being so chosen as to obtain a desired rotational speed of radiation diagram as a result of the radiation which passes all the masks.

In the preferred and simplest construction in accordance with the invention there are two hollow cylindrical concentric masks arranged within one another and each having a ring of a different number of equally spaced slots and means are provided for rotating one or both of the two masks.

The invention is illustrated in and explained in connnection with the accompanying schematic drawings in which Figure 1 is a figure, provided for purposes of explanatory comparison, showing one form of O. R. B. which is not in accordance with the present invention and Fig. 2 is an "exploded" view illustrating one embodiment of the invention.

Referring to Fig. 1 the form of omni-directional radio beacon (not in accordance with this invention) therein shown has an aerial installation consisting of a tubular wave guide G mounted with its axis vertical and having a ring of vertical slots S cut in the cylindrical shield of the wave guide. The slots are equally spaced around the circumference of the guide so as to produce substantially uniform radiation in the direction of the horizontal plane when excited from a source of high frequency energy of suitable polarization situated within the said guide. The said source may be, for example, a horizontal loop L. In order to superimpose upon this omnidirectional radiation a rotational component of radiation which revolves at a desired speed and has a directional characteristic corresponding approrimately to a cardioid diagram, there is also provided inside the guide, a dipole aerial D which is excited with high frequency energy in the correct phase to produce the desired radiation pattern and which is mechanically rotated at the required speed. The dipole may, for example, be rotated at 1800 R. P. M., this being a typical speed of rotation required in practice for the directional radiation component.

The arrangement just described has a number of practical defects the most important being that the rotation of the separately excited dipole aerial at a speed of the order of 1800 R. P. M. involves obvious mechanical difficulties.

The present invention may be applied with great advantage to an O. R. B. as above described to produce the required rotary radiation diagram without, however, requiring excitation of a separate rotary aerial (the dipole D) and without requiring any mechanical rotation at the speed of rotation of the radiation diagram.

A preferred way of applying the present invention to an O. R. B. as above described is illustrated in Fig. 2. As will be seen the slotted wave guide shield G is retained but the rotary dipole D of Fig. 1 is omitted and in lieu thereof there is provided a metallic slotted sleeve GI which is concentric with the wave guide shield and is of slightly less diameter so that it fits closely but freely inside the same. In Fig. 2, for simplicity in drawing, the sleeve GI is shown withdrawn from the shield G. Also the loop or other exciting source—which is, of course, provided in Fig. 2 as in Fig. 1—is not shown. The slots SI in the sleeve GI are equally spaced around it but the number is different from the number of slots S in the shield G. For example, if there are twelve slots S in the shield G there may be 11 or 13 slots SI in the sleeve GI.

Means (not shown) are provided for producing relative rotation between the sleeve G1 and shield G. In the simplest case the shield is stationary and the sleeve is rotated inside it. The effect on the radiation pattern as rotation takes place is that the sleeve masks the radiation (at any particular instant) in one direction only, namely that in which the solid material of the sleeve covers (at that particular instant) a slot in the shield. As the sleeve rotates the effective aperture also rotates but at a much greater speed than the speed of mechanical rotation; thus if there are 12 slots in the shield and 11 in the sleeve, the speed of rotation of the radiation pattern is 11 times that of the mechanical rotation. Furthermore the effective size of the aperture excited by the internal radiator remains substantially constant as the sleeve rotates, so that the matching of the slots with the exciting element is unaffected.

In effect therefore, the slots in the sleeve and shield interlace and the masking effect can be selected as desired by suitably selecting the relative dimensions of the slots and the spaces between them in dependence on the depth of radiation modulation required and the required form of radiation pattern.

The invention is not limited to its application to omni-directional radio beacons nor to the particular structure above described. Thus it is not essential that the masks should be cylindrical with longitudinal slots as described, or that there should be only two masks, for more complex forms of rotating radiation modulation can be obtained by using more than two masks rotating with different relative speeds.

We claim:

1. In a radio beacon aerial installation for providing a rotary radiation diagram, a first slotted tubular mask having a first predetermined plurality of slots equally spaced from one another around said mask in a ring, at least one further slotted tubular mask having a second predetermined plurality of slots in a ring of slots and equally spaced from one another around said further mask, said second plurality differing from said first plurality by one and said further mask being concentrically disposed within said first mask, means for producing relative rotation between said masks to sweep the slots in one mask across the slots in the other, and a source of radio energy within said masks.

2. In a radio beacon aerial installation for providing a rotary radiation diagram, a first slotted tubular mask having a predetermined plurality of equally spaced slots arranged in a ring around the circumference thereof, a second slotted tubular mask having a different plurality of equally spaced slots arranged in a ring around the circumference thereof, said different plurality differing by one from said predetermined plurality, said second mask being concentrically disposed within said first mask, means for producing relative rotation between said masks to sweep the slots in one mask across the slots in the other, and a source of radio energy within said masks, one of said masks being stationary.

3. In a radio beacon aerial installation for providing a rotary radiation diagram, a first slotted tubular mask having a predetermined plurality of equally spaced slots in a ring around the circumference thereof, at least one further slotted tubular mask having a different plurality of equally spaced slots arranged in a ring around the circumference thereof, said different plurality differing by one from said predetermined plurality, said further mask being concentrically disposed within said first mask, means for producing relative rotation between said masks to sweep the slots in one mask across the slots in the other, and a source of radio energy within said masks, one of said masks constituting part of a wave guide.

4. In a radio beacon aerial installation for providing a rotary radiation diagram, a first slotted tubular mask having a predetermined plurality of equally spaced slots arranged in a ring around the circumference thereof, a further slotted tubular mask having a different plurality of equally spaced slots arranged in a ring around the circumference thereof, said different plurality differing by one from said predetermined plurality, said further mask being concentrically disposed within said first mask, means for producing relative rotation between said masks to sweep the slots in one mask across the slots in the other, and a source of radio energy within said masks, one of said masks being stationary and constituting part of a wave guide.

JAMES FREDERICK HATCH.
JOHN WILLIAM BRITTAIN.

REFERENCES CITED

The following references are of record in the file of this patent:

UNITED STATES PATENTS

| Number | Name | Date |
|---|---|---|
| 1,877,566 | Elsey et al. | Sept. 13, 1932 |
| 1,963,255 | Zimber | June 19, 1934 |
| 2,075,808 | Fliess | Apr. 6, 1937 |
| 2,417,076 | Hickman | Mar. 11, 1947 |
| 2,436,380 | Cutler | Feb. 24, 1948 |
| 2,438,735 | Alexanderson | Mar. 30, 1948 |
| 2,460,401 | Southworth | Feb. 1, 1949 |
| 2,480,181 | Breen et al. | Aug. 30, 1949 |